(12) United States Patent
Cohen

(10) Patent No.: US 6,516,308 B1
(45) Date of Patent: Feb. 4, 2003

(54) METHOD AND APPARATUS FOR EXTRACTING DATA FROM DATA SOURCES ON A NETWORK

(75) Inventor: William W. Cohen, Pittsburgh, PA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/568,145

(22) Filed: May 10, 2000

(51) Int. Cl.[7] .................... G06F 15/18; G06F 17/30; G06F 7/00

(52) U.S. Cl. .................. 706/12; 706/47; 706/25; 707/5

(58) Field of Search ............... 706/12, 25, 47; 707/5

(56) References Cited

U.S. PATENT DOCUMENTS

| | | | | |
|---|---|---|---|---|
| 5,719,692 A | * | 2/1998 | Cohen ................ | 706/14 |
| 5,826,258 A | | 10/1998 | Gupta et al. ............ | 707/4 |
| 6,182,058 B1 | * | 1/2001 | Kohavi ............... | 706/20 |
| 6,295,533 B2 | * | 9/2001 | Cohen ................ | 704/9 |
| 6,418,432 B1 | * | 7/2002 | Cohen et al. ........... | 707/5 |

OTHER PUBLICATIONS

Hearst et al., Information Integration, IEEE Intelligent Systems, Sep. 1998, vol. 13, Iss. 5, pp. 12–24.*

Drucker et al., Support Vector Machines for Spam Categorization, IEEE Transactions on Neural Networks, Sep. 1999 vol. 10, No. 5, pp. 1048–1054.*

Feldman, R., Mining Unstructured Data, Tutorial Notes of the 5th ACM SIGKDD International Conference on Knowledge Discovery and Data Mining, 1999, pp. 182–236.*

Cohen et al., Context–Sensitive Learning Methods for Text Categorization, Proceedings of the 19th Annual International ACM SIGIR Conference on Research and Development in Information Retrieval, 1996, pp. 307–315.*

Lee et al., Mining in a Data–Flow Environment: Experience in Network Intrusion Detection, Proceedings of the 5th ACM SIGKDD International Conference on Knowledge Discovery and Data Mining, 1999, pp. 114–124.*

Ng et al., Feature Selection, Perceptron Learning, and a Usability Case Study for Text Categorization, Proceedings of the 20th Annual International ACM SIGIR Conference on Research and Development in Information Retrieval, 1997, pp. 67–73.*

Kushmerick, N., Learning to Remove Internet Advertisements, Proceedings of the 3rd Annual Conference on Autonomous Agents, 1999, pp. 175–181.*

Cohen, W., Learning Rules that Classify E–mail, Advances in Inductive Logic Programming, IOS Press, 1996, pp. 124–143.*

Cohen et al., Learning to Query the Web, Advances in Inductive Logic Programming, IOS Press, pp. 124–143.*

Sasaki et al., Rule–Based Text Categorization Using Hierarchical Categories, 1998, IEEE International Conference on System Man and Cybernetics, Oct. 1998, vol. 3, pp. 2827–2830.*

(List continued on next page.)

*Primary Examiner*—Thomas Black
*Assistant Examiner*—Kelvin Booker
(74) *Attorney, Agent, or Firm*—Banner & Witcoff, Ltd.

(57) ABSTRACT

A method and apparatus is provided for producing a general data extraction procedure capable of extracting data from data sources on a network regardless of data format. The general data extraction procedure is determined from a plurality of pairs of data from the network, each pair including a data source and a program which accurately extracts data from the data source. The pairs of data are processed by a learning system to learn a general program for extracting data from new data sources.

28 Claims, 11 Drawing Sheets

(Labeled parse tree)

OTHER PUBLICATIONS

Li et al., Text Classification Using ESC–Based Stochastic Decision Lists, Proceedings of the 8th International Conference on Information and Knowledge Management, 1999, pp. 122–130.*

Nicholas Kushmerik, Daniel S. Weld, Robert Doorenbos, "Wrapper Introduction for Infomation Extraction", In *Proceedings of the 15th International Joint Conferences on Artificial Intelligence*, 1997.

J. Hammer et al., "Extracting Semistructured Information from the Web", in *Proceedings of the workshop on Management of Semistructured Data*, http://www–db.Stanford.edu, http://dbpubs.stanford.edu/pub/1997–38, May 1997.

William W. Cohen et al. "Learning Page–Independent Heuristics for Extracting Data from Web Pages", In Proceedings of the 1998 AAAI Spring Symposium on Intelligent Agents in Cyperspace, Oct. 15, 1998.

Alon Y. Levy et al., "Querying Heterogeneous Information Sources Using Source Descriptions" In *Proceedings of the 22nd International Conference on Very Large Databases (VLDB–96)*, Sep. 1996.

William W. Cohen, "Fast Effective Rule Induction", In *Machine Learning: Proceedings of the 12th International Conference (ML95)*, 1995.

William W. Cohen, "WHIRL: A Word–based Information Representation Language", 1998.

William W. Cohen, "Learning Trees and Rules with Set –valued Features", In Proceedings of AAAI'96, IAAI'96, pp. 709–716, 1996.

William W. Cohen, "A Web–based Information System that Reasons with Structured Collections of Text", *In Proceedings of Autonomous Agents*, 1998.

William W. Cohen, "The WHIRL approach to integration: An overview", *In Proceedings of the AAAI–98 Workshop on AI and Information Integration*, AAAI Press, 1998.

Naveen Ashish et al., "Wrapper Generation for Semi–structured Internet Sources", *In Proceedings of the Workshop on Management of Semistructured Data*, May 1997.

William W. Cohen, "Integration of Heterogeneous Databases Without Common Domains Using Queries Based on Textual Similarity", In *Proceedings of ACM SIGMOD–98*, 1998.

* cited by examiner

```
<html><head> ... </head>
<body>
<h1>Editorial Board Members</h1>
<table><tr>
<td>B.R. Emlin, Lucent</td>
<td>Harry Q. Bovik, Branberry U. </td></tr>
<tr>
<td>Bat Gangley, US/Bovine</td>
<td>Phoebe L. Mind, Lough Tech</td>
```
...

Fig. 3

| G.R. Emlin, Lucent | |
|---|---|
| Harry Q. Bovik, Cranberry U. | |
| ... | |

Fig. 4

(Labeled parse tree)

Rule 1. Label a node "positive" if tagName= "a" and normalizedNodeSuffixCount >= 0.445545

Rule 2. Label a node "positive" if tagName = "a", normalizedNodeSuffixCount >= 0.2666355, and Depth <=4.

Rule 3. Label a node "positive" if normalizedNodePrefixcount >=0.688634, tagName="p" and numSiblings >=317.

Rule 4. Label a node "positive" if tagName="td" and normalizedNodePrefixCount >=0.981132.

Fig. 8

Exploding porpoises, over four score and seven, well before configuration

- Department of Computer and Information Science, University of New Jersey. Citrus Flavorings: green, marine, clean and under lien.

- Computer Engineering Center, Lough Polytechnical Institute. This, that page extensionally left to rights of manatees.

- Electrical engineering and Computer Science Dept., Bismark State College. Tertiary; where cola substitutes are frequently underutilized.

Fig. 11

```
<html><head> ... </head>
<body><h1>Publications for Phoebe Mind</h1>
<ul>
<li>Optimization of fuzzy neural networks using distributed
parallel case-based genetic knowledge discovery
        (<a href="buzz.pdf">PDF</a>)</li>
<li>A linear-time version of GSAT
        (<a href="peqnp.ps">postscript</a>)</li>
```

Extracted Data

| Optimization of fuzzy neural networks using distributed parallel case-based genetic knowledge discovery | Buzz.pdf | |
|---|---|---|
| A linear-time version of GSAT | Peqnp.ps | |
| ... | ... | |

Fig. 12 fruitful_piece(Path1,Path2)←
    possible_piece(Path1,Path2)∧
    many (extracted_by(Path1a, Path2a,...),
              (Path1a=Path1∧Path2a=Path2)).

Possible_piece(Path1,Path2)←
    elt(textElt,_,_, Path1)
    ∧elt(AnchorElt, "href", _)
    ∧attr(AnchorElt, "href", _)
    ∧path(TextElt, AnchorElt, Path2).

Extracted_by(Path1,Path2, TextElt, AnchorElt)←
    elt(TextElt,_,_, Path1)
    ∧path(TextElt, AnchorElt, Path2).

anchorlike_piece(Path1, Path2)←
    possible_piece(path1,Path2)∧
    many(extracted_by(path1a,Path2a,TElt,AElt),
              (Path1a=Path1 ∧ Path2a=Path2
              ∧ elt(TElt,_, Text1, _)∧elt(AElt,_, Text2,_)∧Text1 ~ Text2).

R_like_piece(Path1,Path2)←
    possible_piece(Path1, Path2)∧
    many(R_extracted_by(Path1a,Path2a,_),
              (Path1a=Path1∧Path2a=Path2)).

R_extracted_by(Path1,Path2,TextElt,AnchorElt)←
    elt(TextElt,_, Text, Path1)
    ∧path(TextElt, AnchorElt, Path2)
    ∧R(X)∧Text ~ R.

Fig. 13

METHOD AND APPARATUS FOR EXTRACTING DATA FROM DATA SOURCES ON A NETWORK

TECHNICAL FIELD

The present invention is directed to a method and apparatus for extracting data from data sources on a network and, more particularly, to a method and apparatus for learning general data extraction heuristics from known data extraction programs for respective data sources to obtain a general data extraction procedure.

BACKGROUND OF THE INVENTION

Computer networks are widely used to facilitate the exchange of information. A network may be a local area network (LAN), a wide-area network (WAN), a corporate Intranet, or the Internet.

The Internet is a series of inter-connected networks. Users connected to the Internet have access to the vast amount of information found on these networks. Online servers and Internet providers allow users to search the World Wide Web (Web), a globally connected network on the Internet, using software programs known as search engines. The Web is a collection of Hypertext Mark-Up Language (HTML) documents on computers that are distributed over the Internet. The collection of Web pages represents one of the largest databases in the world. However, accessing information on individual Web pages is difficult because Web pages are not a structured source of data. There is no standard organization of information provided by a Web page, as there is in traditional databases.

Attempts have been made to address the problem of accessing data from Web pages. For example, information integration systems have been developed to allow a user to query structured information that has been extracted from the Web and stored in a knowledge base. In such systems, information is extracted from Web pages using special-purpose programs or "wrappers". These special-purpose programs convert Web pages into an appropriate format for the knowledge base. In order to extract data from a particular Web page, a user must write a wrapper, which is specific to the format of that Web page. Therefore, a different wrapper must be written for the format of each Web page that is accessed. Because data can be presented in many different formats, and because Web pages frequently change, building and maintaining wrappers and information integration systems is time-consuming and tedious.

A number of proposals have been made for reducing the cost of building wrappers. Data exchange standards such as the extensible Markup Language (XML) have promise, but such standards are not yet widely used. In addition, Web information sources using legacy formats, like HTML, will be common for some time, and therefore, extraction methods must be able to extract information from these legacy formats. Special languages for writing wrappers and semi-automated tools for wrapper construction have been proposed, as well as systems that allow wrappers to be trained from examples. However, none of these proposals eliminate the human effort involved in creating a wrapper for a Web page. Moreover, the training methods are directed to learning a wrapper for Web pages with a single, specific format. Consequently, a new training process is required for each Web page format.

More particularly, when a learning system is used, for example, it is necessary for a person to label the samples given to the learning algorithm. More particularly, a user must label the first few items that should be extracted from the particular Web page starting from the top of the page. These are assumed to be a complete list of items to be extracted up to this point. That is, it is assumed that any unmarked text preceding the last marked item should not be extracted. The learning system then learns a wrapper from these examples, and uses it to extract data from the remainder of the Web page. The learned wrapper can be used for other Web pages with the same format as the page used in training. Therefore, in the learning system, human input is required to determine the page-specific wrapper.

These problems are not limited to retrieving data from HTML documents. These problems exist for documents found on any network.

Therefore, a general, page-independent data extraction procedure was needed to enable a user to easily and accurately extract data from data sources having many different formats. Additionally, an improved format-specific data extraction procedure was needed to accurately extract data from data sources. A procedure was also needed for determining a ranked list of possible data extraction procedures available for accurately extracting data from a data source. The present invention was developed to accomplish these and other objectives.

SUMMARY OF THE INVENTION

In view of the foregoing, it is a principal object of the present invention to provide a method and apparatus which eliminates the deficiencies of the prior art.

It is a further object of the present invention to provide a method and apparatus for learning general data extraction heuristics to generate a general data extraction procedure to enable a user to extract data from a data source on a network, regardless of the format of the data source.

It is another object of the present invention to provide a method and apparatus for learning a general data extraction procedure and for using this procedure to learn a format-specific wrapper.

It is yet a further object of the present invention to provide a method and apparatus for generating a ranked list of wrappers available for accurately extracting data for a particular data source on a network.

These and other objects are achieved by the present invention, which according to one aspect, provides a method and apparatus for learning a general data extraction procedure from a set of working wrappers and the data sources they correctly wrap. New data sources that are correctly wrapped by the learned procedure can be incorporated into a knowledge base.

According to another aspect of the present invention, a method and apparatus are provided for using the learned general data extraction heuristics for the general procedure to learn specific data extraction procedures for data sources, respectively.

According to yet another aspect of the present invention, a list of possible wrappers for a data source is generated, where the wrappers in the list are ranked according to performance level.

BRIEF DESCRIPTION OF THE DRAWINGS

In the drawings:

FIG. 3 represents the HTML source code for a Web page from which data is to be extracted;

FIG. 4 illustrates the data extracted from the Web page shown in FIG. 3;

FIG. 8 illustrates an example of the rules obtained by the learning system associated with the general data extraction procedure;

FIG. 11 illustrates information on a sample Web page;

FIG. 12 illustrates the HTML source code for a Web page including a simple list and the data extracted from this page according to the present invention; and FIG. 13 illustrates programs for recognizing structures in an HTML page according to the present invention.

DETAILED DESCRIPTION

In the description that follows, the present invention will be described in reference to preferred embodiments that operate on the Web. In particular, examples will be described which illustrate particular applications of the invention on the Web. The present invention, however, is not limited to any particular information source nor limited by the examples described herein. Therefore, the description of the embodiments that follow is for purposes of illustration and not limitation.

Figure 1:
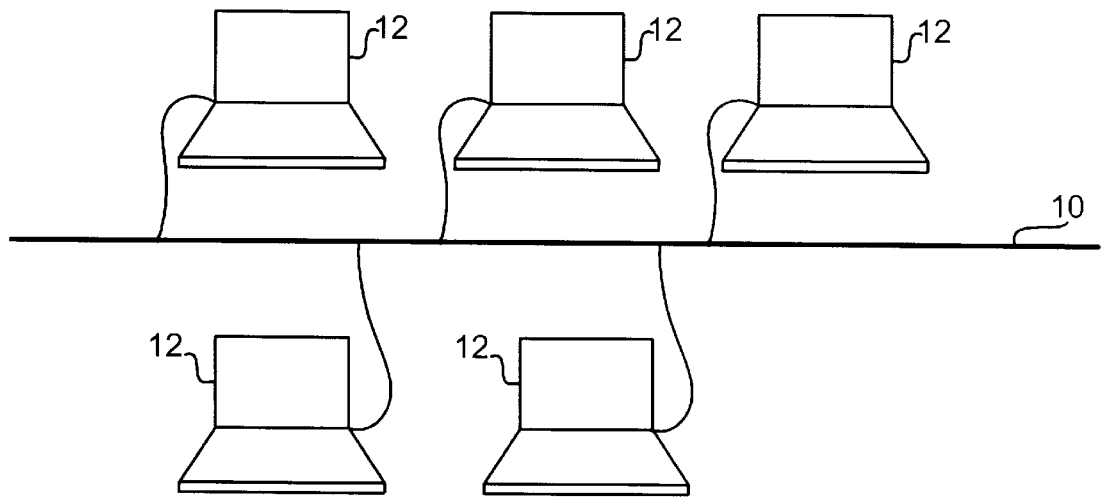
FIG. 1 is a block diagram of a system according to the present invention.
Figure 2:
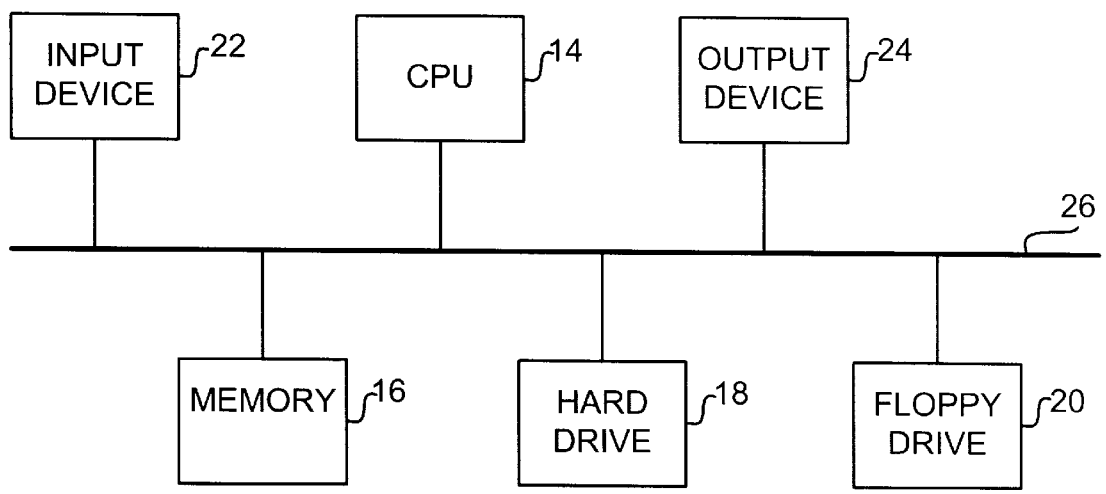
FIG. 2 is a block diagram of one of the user stations illustrated in FIG. 1.

Referring to FIG. 1, users are connected to a network 10 via user stations 12. The user stations 12 may be, for example, personal computers, workstations, minicomputers, mainframes, or a Web Server. The network 10 in the present invention may be any network such as a LAN, a wide-area network (WAN), a corporate Intranet, or the Internet, for example. Each of the user stations 12 usually includes a central processing unit (CPU) 14, a memory 16, a hard drive 18, a floppy drive 20, at least one input device 22 and at least one output device 24, connected by a data bus 26, as shown in FIG. 2. The input device 22 may be a keyboard or a mouse, while the output device 24 may be a display or a printer, for example.

Learning Page-Independent Heuristics for Extracting Data from Web Pages

Users connected to the Internet can access Web pages containing information on just about any imaginable subject. Web pages are represented as HTML documents. An example of the HTML source code for a sample Web page from which data is to be extracted is shown in FIG. 3. A wrapper, which is known to correctly wrap the page shown in FIG. 3, is used to extract the data shown in FIG. 4. In order to extract the data, the wrapper manipulates the HTML parse tree for the Web page. The HTML parse tree is a tree with nodes labeled by tag names such as body, table, and ul. The wrapper manipulates the HTML parse tree primarily by deleting and re-labeling the nodes of the parse tree. In other words, the wrapper converts the HTML parse tree for the particular Web page into another tree labeled with terms compatible with a knowledge base, so that the extracted data can be stored directly into the knowledge base.

In order to automatically learn a wrapper, it is necessary to use a learning system with a learning algorithm. Learning systems usually learn to classify information. More particularly, learning systems learn to associate a class label from a small, fixed, set of labels with an unlabeled instance. Therefore, to implement a classification learner on data extraction problems, it is necessary to re-cast the extraction problem as a labeling problem. Since each data item extracted from the Web page by the wrapper corresponds to a node in the HTML parse tree, the output of the wrapper can be encoded by appropriately labeling parse tree nodes. Therefore, each node in the HTML parse tree is an unlabeled instance which can be encoded by properly labeling the node.

Figure 5:
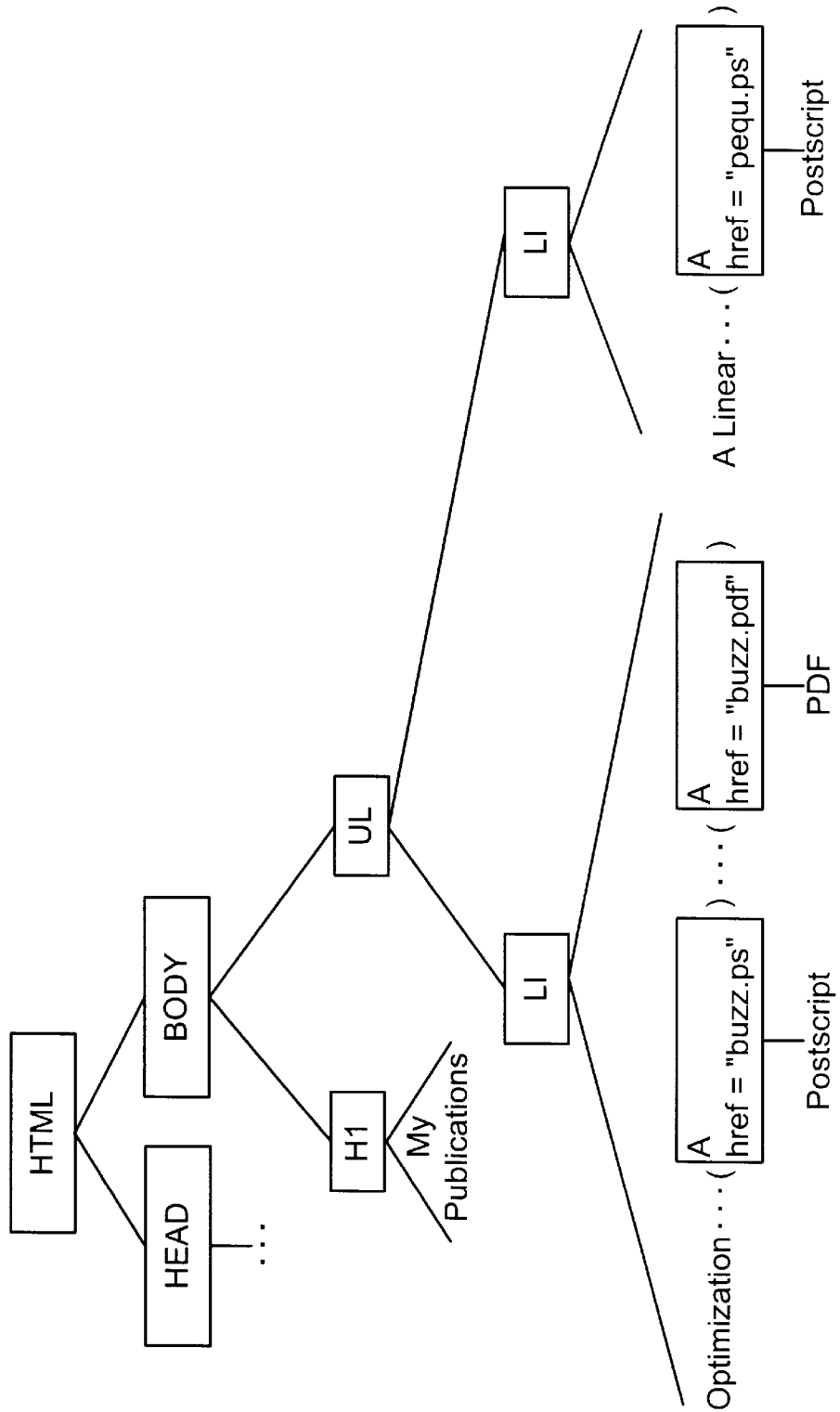
FIG. 5 illustrates the HTML parse tree for the Web page shown in FIG. 3.
Figure 6:
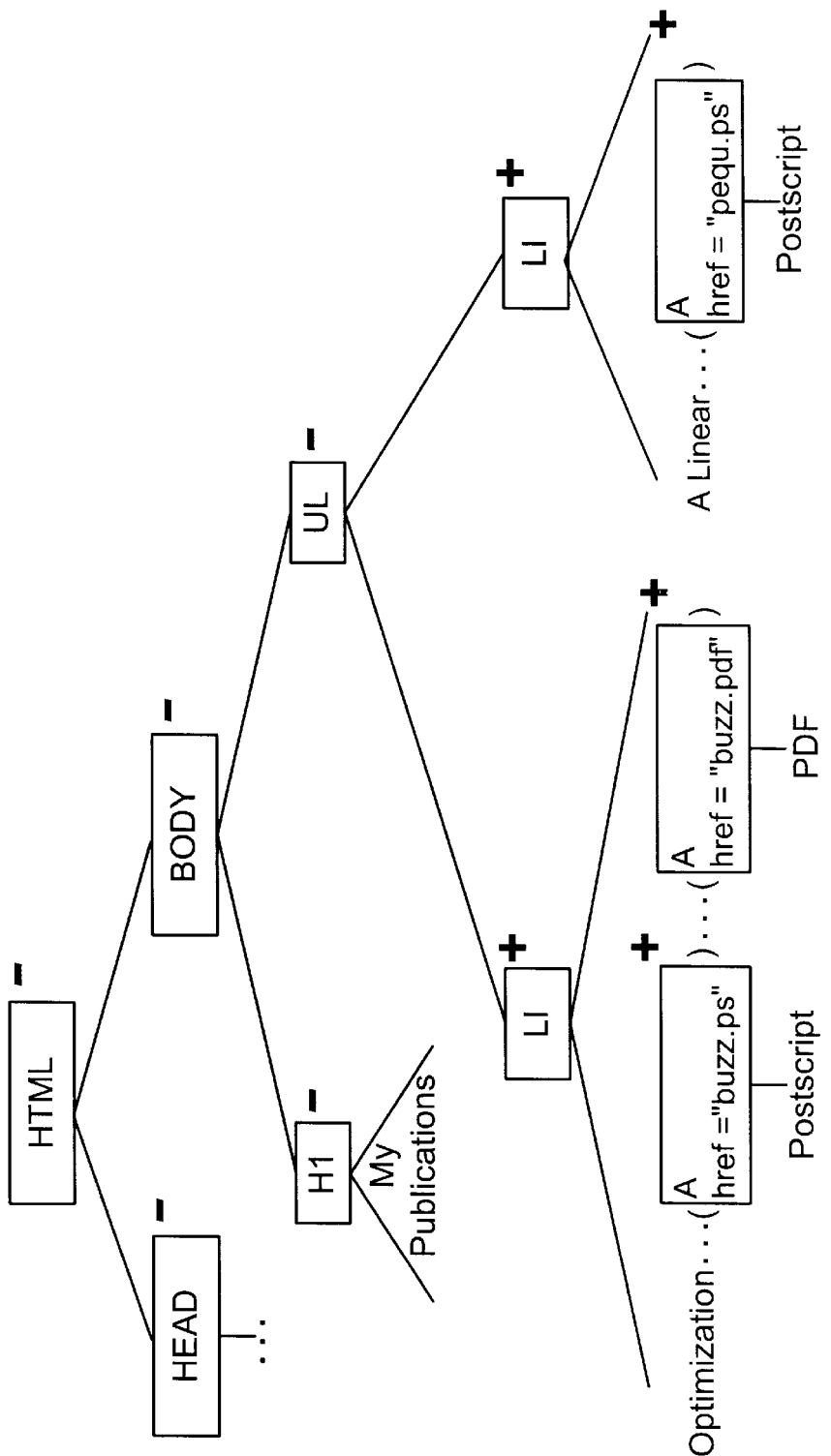
FIG. 6 illustrates a classification tree obtained by re-labeling the nodes of the HTML parse tree shown in FIG. 5.

The HTML parse tree for the Web page shown in FIG. 3 is illustrated in FIG. 5. The action of a wrapper can be encoded by labeling the nodes of the HTML parse tree as "positive" or "negative", where a node is labeled as "positive" if the text of the node is extracted by the wrapper, and labeled as "negative" otherwise. In the HTML parse tree in FIG. 5, every<li> node would be labeled "positive", and all other nodes would be labeled "negative". This is shown in FIG. 6. Extracting the text of each <li> node yields the database entries shown in FIG. 4.

Knowledge base entries are extracted from the Web page by the wrapper. The labeling of the nodes in the HTML parse tree indicates which nodes contribute text to the knowledge base entries. Nodes labeled "positive" do contribute text, and nodes labeled "negative" do not contribute text to the knowledge base.

In sum, the task of extracting data from a Web page can be recast as the task of labeling each node in the HTML parse tree for the page. A wrapper can be represented as a procedure for labeling HTML parse tree nodes. Such a node-labeling procedure can be learned from a sample of correctly labeled parse tree nodes. A set of correctly labeled parse tree nodes, in turn, can be generated given an existing wrapper and a page that is correctly wrapped.

The foregoing principles can be applied to learn general, page-independent heuristics to obtain a general data extraction procedure. The general data extraction procedure can be used to extract data from Web pages regardless of Web page format.

According to the present invention, general, page-independent heuristics for extracting data from Web pages are learned from a data set including data extracted from Web pages that have been correctly wrapped. More particularly, the input to the learning system according to the present invention is a set f working wrappers paired with the corresponding HTML Web pages they correctly wrap. The data extracted from the sample Web pages is stored in a database or, information integration system. The database may be any form of database suitable for storing data extracted from the Web, such as the database described in U.S. Pat. No. 6,295,533, entitled System and Method for Accessing Heterogeneour Databases and issued on Sep. 25, 2001, called WHIRL, which is incorporated by reference herein. The data is then processed by a learning algorithm, such as the algorithm for Repeated Incremental Pruning to Produce Error Reduction (RIPPER) disclosed in U.S. Pat. No. 5,719,692, entitled Rule Induction on Large Noisy Data Sets and issued Feb. 17, 1998, which is incorporated be reference herein. Any suitable learning algorithm may be used. The learning algorithm generates procedure for extracting data from Web pages regardless of format.

Figure 7:
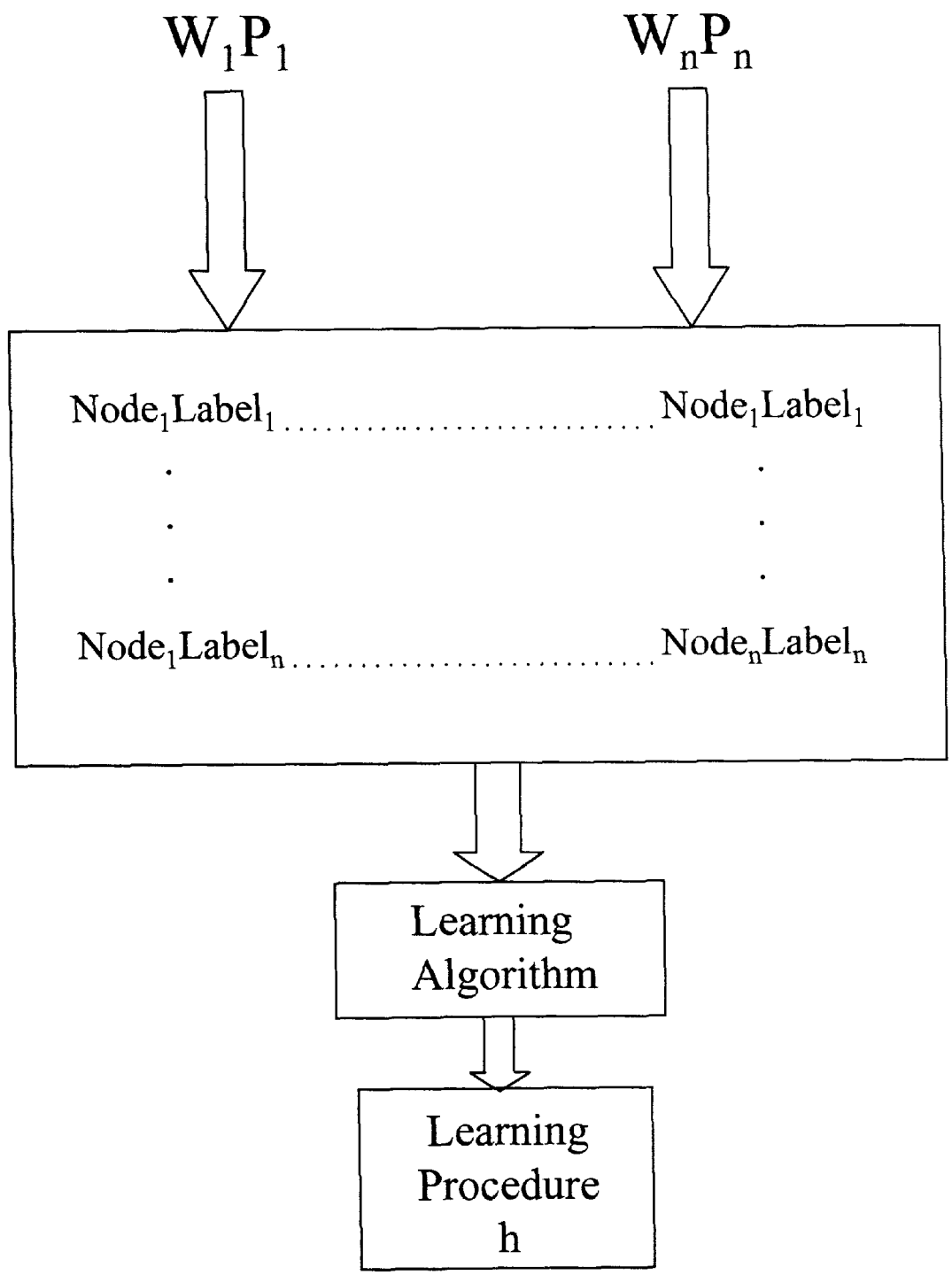
FIG. 7 illustrates the flow of data for generating a general data extraction procedure.

More particularly, a set of wrappers $W_1, \ldots, W_N$ that correctly wrap the Web pages $p_1, \ldots, p_N$ are used to learn a general, page-independent data extraction procedure. Referring to FIG. 7, for each pair $w_i, p_i$, find the parse tree for the page $p_i$, and label the nodes in that tree according to the wrapper $w_i$. This results in a set of labeled parse tree nodes $<n_{i,1}, 1_{i,1}>, \ldots, <n_{i,mi}, 1_{i,mi}>$, which are added to a data set S. The data set S is used to train a classification learner, such as RIPPER. As with any learning procedure, the larger the data set, the better the performance. In experiments, 84 wrapper/Web page pairs were used to obtain the data set. The output of the learner is a general node-labeling procedure h, which is a function mapping parse tree nodes to the set of labels, {positive, negative, for example}:

h: parse-tree-node→{positive, negative}.

The learned function h can then be used to label the parse tree nodes of new Web pages, and thereby extract data from these pages.

In experiments, the classification learning system RIPPER was used. RIPPER, like most classification learners, learns to associate a class label with an unlabeled instance; that is, it requires an example to be represented as a vector of relatively simple features. More particularly, in order to label HTML parse tree nodes as "positive" or "negative", they are encoded as learning "instances". A learning instance is a set of relevant features that the parse tree node has. One keeps track of which learning instance corresponds to which node in the tree. The label assigned to the learning instance is considered to be assigned to the parse tree node. Hence, labeling nodes and labeling learning instanced may be discussed interchangeably. The learning algorithm takes labeled instances (instances where the label is given by the known wrapper) and builds a classifier (general data extraction procedure). The classifier consists of a set of rules that choose a label ("positive" or "negative") based on the features of the instance (e.g., features of the HTML parse tree node). The classifier can then be used to label new instances.

Features which are plausibly related to the classification task may be used in the learning system. The value of each feature is either a real number, or a symbolic feature, such as an atomic symbol from a designated set like {positive, negative}. The primitive tests for each feature include a real-valued feature which is of the form $f \geq \theta$ or $f \leq \theta$, where f is a feature and $\theta$ is a constant number, and the primitive tests for a symbolic feature is of the form $f=a_i$, where f is a feature and $a_i$ is a possible value for f. RIPPER also allows set-valued features. The value of a set-valued feature is a set of atomic symbols, and tests on set-valued features are of the form $a_i \epsilon$ f, where f is the name of a feature and $a_i$ is a possible value (e.g., u1 $\epsilon$ancestorTagNames). For two-class problems of this sort, RIPPER uses a number of heuristics to build a disjunctive normal form formula that generalizes the positive examples. This formula is usually a set of rules, each rule having the form "label an instance 'positive' if t1 and t2 and . . .", where each ti in the rule is the primitive test on some feature.

In experiments, the following series of features were used to describe a parse tree node. The tag name feature is the HTML tag name associated with the node, such as a, p, br, and html. This is an informative feature because some tags such as "head" are always negative, while other tags such as the anchor tag a are often positive. The size of the string si directly associated with a node was measured in two ways: (1) the text length which is the total size of all of the text associated with a node, and (2) the non-white text length which is similar to the text length, but ignores blanks, tabs, and line returns. The length of the text contained in the sub-tree rooted at the current node was measured by the features of recursive text length and recursive, non-white text length The string is directly associated with the node if it is contained in the HTML element associated with the node, and not contained in any smaller HTML element. These features are important because they measure the size of the string $s_i$ that would be extracted if the node were marked as positive. Other natural and easily computed features include set of ancestor tag names, depth, number of children, number of siblings, parent tag name, set of child tag names, and set of descendent tag names. Since the size of parse trees vary, many of the above-identified features can be normalized by the total number of nodes or by the maximal node degree.

The following features are intended to detect and quantify repeated structure in the parse tree. The repetitive aspect of a structure can often be detected by looking at the sequence of node tags that appear in the paths through the tree. To measure this repetition, let tag(n) denote the tag associated with a node n, and define the tag sequence position of n, p(n), as the sequence of tags encountered in traversing the path from the root of the parse tree to n, such as p(n)=<html, . . . , tag(n)>. If p(n1)=<t1, . . . tk>, and p(n2)=<t1, . . . tk, tk+1, . . . tm>, then it is determined that the tag sequence position p(n1) is a prefix of p(n2). If p(n1) is strictly shorter than p(n2), then it is determined that the tag sequence position p(n1) is a proper prefix of p(n2).

The feature of the node prefix count for n is used as a way of measuring the degree to which n participates in a repeated substructure. The node prefix count for n, $p_{count}(n)$, is the number of leaf nodes l in the parse tree that the tag sequence position of n is a prefix of the tag sequence of l. More formally, $p_{count}(n)=|\{l:p(n)$ is a tag sequence prefix of p(l), l is a leaf}|. The node suffix count for n, s(n), is closely related. The feature of the node suffix count is defined as the number of leaf nodes l with tag sequence positions of which p(n) is a proper prefix. Both , $p_{count}(n)$ and $s_{count}(n)$ can be normalized by the total number of paths in the parse tree.

FIG. 8 illustrates some representative rules that appeared in the hypothesis obtained by training RIPPER on all of the 84 wrapper/page sample pairs using the features noted above.

The features discussed herein are illustrative of the types of features that may be used. They are not intended to represent necessary features or the only features to be used.

Figure 9:
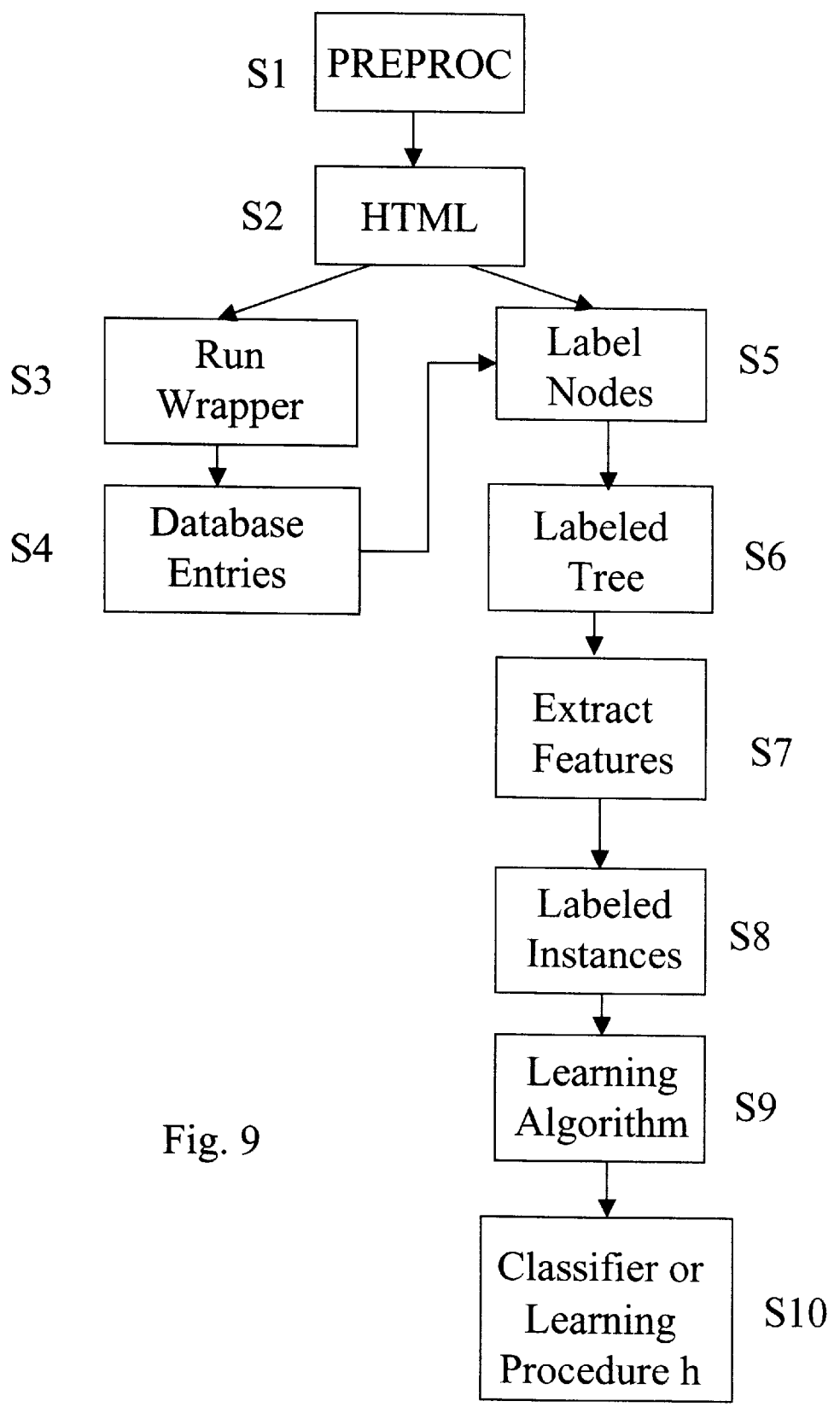
FIG. 9 is a flow diagram illustrating the steps required to generate the general data extraction procedure according to the present invention.

The steps performed in determining the learned function h are shown in FIG. 9. Preprocessing is performed in step S i to obtain a Web page in step S2. The wrapper known to wrap the Web page is run in step S3 to obtain database entries in step S4. The nodes in the HTML parse tree are labeled in step S5 to generate the labeled tree in step S6. The features for each node are extracted in step S7 to label the unlabeled instanced in the tree in step S8. Steps S1-S8 are repeated for a plurality of Web pages which form the sampling for the learning algorithm. The data output from the repeated steps are supplied to the learning algorithm in step S9, which outputs the learned function h.

According to the present invention, page formats that are correctly wrapped by the learned heuristics can be incorporated into a knowledge base with minimal human effort. It is only necessary to indicate where in the knowledge base the extracted data should be stored. In contrast, typical wrapper-induction methods require a human teacher to train them on each new page format.

The learned format-independent data extraction heuristics of the general data extraction procedure substantially improve the performance of methods for learning page-specific wrappers as well. More particularly, the method of generating the general data extraction procedure can be used to learn page-specific or format-specific wrappers.

Page-specific wrapper induction is performed by training a new wrapper for each new page format using examples specific to the particular Web page. Typically, the wrapper-induction system is trained as follows. The user labels the first few items that should be extracted from the page starting from the top of the page. The learning system then learns a wrapper from these examples, and it uses the learned wrapper to extract data from the remainder of the page. The learned wrapper can also be used for other pages with the same or similar format as the page used in training.

Page-specific wrappers can also be trained using the approach set forth above with respect to the general data extraction procedure, the only difference being the way that a data set is constructed, and the circumstances in which the learned wrapper is used. More particularly, in learning a page-specific wrapper, all training examples come from the page being wrapped, and the learned classifier is only used to label parse tree nodes from the particular page (or other pages with the same format as the particular page).

According to the present invention, a hybrid approach may be used to obtain a page-specific wrapper. According to the hybrid approach, page-independent heuristics are learned from a plurality of pages other than the page to be wrapped. Then the learned page-independent heuristics are used to attempt to wrap the page. If the user accepts this wrapper, or if the performance goal is reached in simulation, the learning is terminated. Otherwise, the user is repeatedly prompted for the next positive example, as in intra-page learning, until the learned wrapper meets the performance goal.

Figure 10:
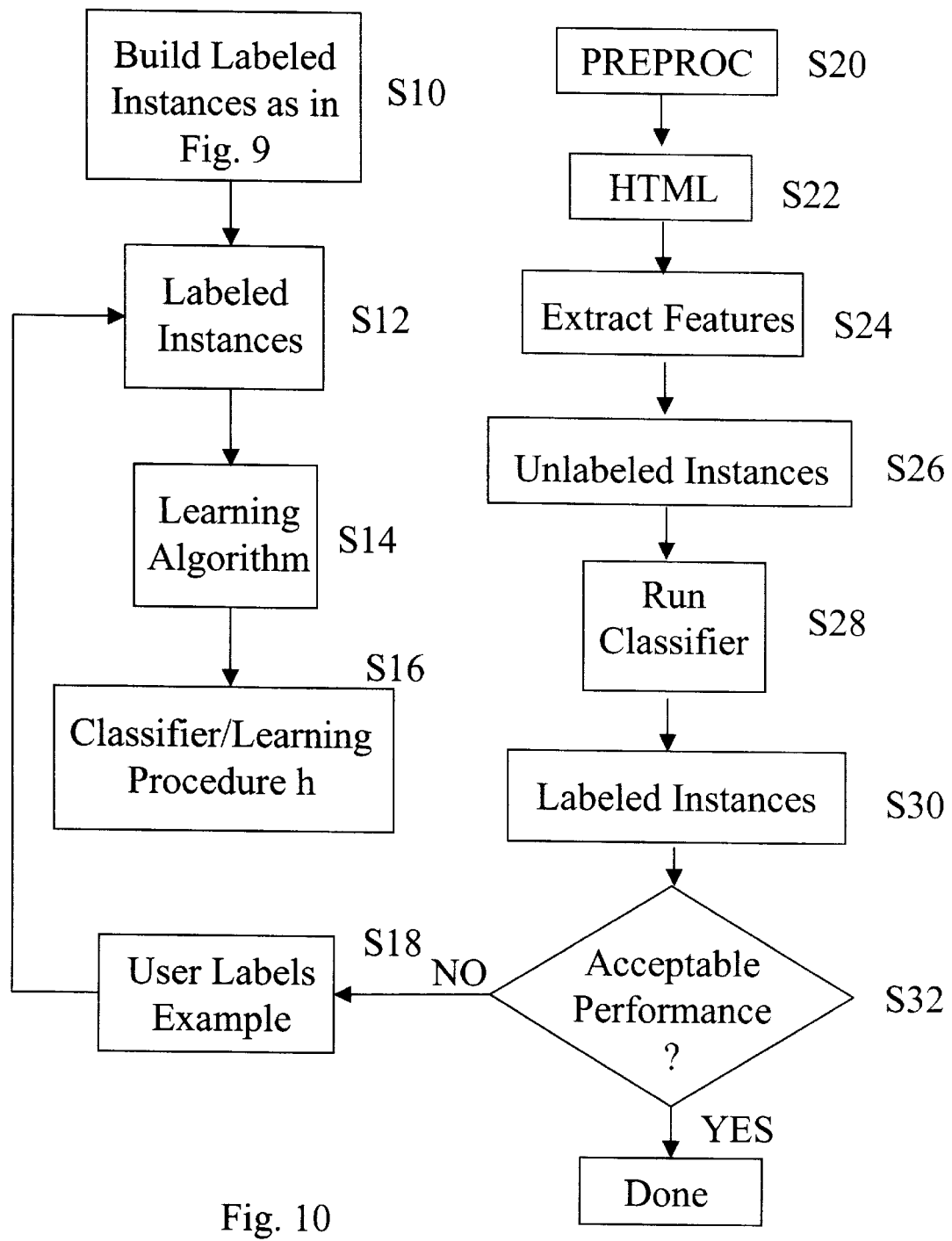
FIG. 10 is a flow diagram illustrating the steps required to implement the format-specific data extraction procedure according to the present invention.

The steps performed in the hybrid method are shown in FIG. 10. In step S10, labeled instances are built according to the steps set forth in FIG. 9. The labeled instances from step S12 are supplied to a learning algorithm in step S14. The learning algorithm generates a classifier or page-independent data extraction procedure in step S16. Then the general data extraction procedure is then run to wrap the page. Preprocessing is performed in step S20 to obtain the page in step S22. Then, features are extracted from the page in step S24 and unlabeled instances obtained in step S26 are supplied to the data extraction procedure or classifier in step S28. The data extraction procedure run in step S28 outputs labeled instances of the HTML parse tree in step S30. In step S32, it is determined whether the performance of the general data extraction procedure is acceptable. If it is acceptable, then the operation is terminated. If the performance is not acceptable, the process returns to step S12 via step S18 where the user labels example to provide more information to the learning algorithm.

Recognizing Structure in Web Pages Using Similarity Queries

Another embodiment of the invention is directed to generating a list of proposed wrappers for wrapping a Web page. The wrappers in the list can be ranked according to performance. The selection of the particular wrapper to use to extract data from the Web page can either be performed by the user or automatically.

According to this embodiment, the information describing each of the nodes of the HTML parse tree for the Web page is stored in a database such as the database described in Ser. No. 09/028,471. The information may include an identifier for the node, the Tag associated with the node, the text associated with the node, and the position of the node within the parse tree. The determination and database storage of the information for each node is well-known in the art, and therefore, is not described in detail herein. The text associated with each node is processed to determine whether it is similar to some known text or objects of the type which are to be extracted from the Web page. The text similarity processing is performed using the well-known Vector-Space method for processing text. Then, a score or measure of similarity is determined for each position in the parse tree based upon the information for each node at the particular position. The positions within the parse tree are then ranked according to score or performance to generate a ranked list of positions or wrappers. In this embodiment, either all of the positions or only a portion of the positions are processed and ranked. A detailed description of this embodiment of the invention is set forth below.

Referring to FIG. 11, to a human reader, this text is perceived as containing a list of three items, each containing the italicized name of a university department, with the university name underlined. This apparently meaningful structure is recognized without previous knowledge or training, even though the text is ungrammatical non-sense and the university names are imaginary. This suggests that people employ general-purpose, page-independent strategies for recognizing structure in documents. Incorporating similar strategies into a system that automatically (or semi-automatically) constructs wrappers would be very invaluable.

Described herein are effective structure recognition methods for certain restricted types of list structures that can be encoded compactly and naturally, given appropriate tool. Each of these methods can be implemented in the WHIRL database program described in U.S. Pat. No. 6,295,533 entitled and issued on Sep. 25, 2001, noted above. However it is to be understood that the invention is not limited to the use of WHIRL, and can be implemented with any suitable database. The WHIRL program is a "soft" logic that includes both "soft" universal qualification, and a notion of textual similarity developed in the information retrieval (IR) community. The structure-recognition methods set forth herein are based on natural heuristics, such as detection repetition of sequences of markup commands, and detecting repeated patterns of "familiar-looking" strings.

The methods can be used in a page-independent manner; that is, given an HTML page, but no additional information, the methods produce a ranked list of proposed "structures" found in the page. By providing different types of information about a page, the same methods can also be used for page-specific wrapper learning or for updating a wrapper after the format of a wrapped page has changed.

The structure-recognition problem will be discussed first. The structure of a Web page is rated as meaningful or not meaningful. The structure in a Web page would be rated as meaningful if it contains structured information that could plausibly be extracted from the page. In experiments, pages that were actually wrapped were used, and a structure was considered meaningful if it corresponded to information actually extracted by an existing, hand-coded wrapper for that page.

In the following description, wrappers for two narrow classes of wrappers are discussed. However, it is to be understood that the discussion is for illustrative purposes and the invention is not limited to the two narrow classes of wrappers. The wrapper classes are simple lists and simple hotlists. In a page containing a simple list, the information extracted is a one-column relation containing a set of strings $s_1, \ldots, S_N$, and each $s_i$ is all the text that falls below some node $n_i$ in the HTML parse tree for the page. In a simple hotlist, the extracted information is a two-column relation, containing a set of pairs $(S_1, U_1), \ldots, (S_n, U_N)$; each $s_i$ is all the text that falls below some node $n_i$ in the HTML parse tree; and each $u_i$ is a URL that is associated with some HTML anchor element $a_i$ that appears somewhere inside $n_i$. FIG. 12 shows the HTML parse source for a simple list and the extracted data, and FIG. 3 illustrates a simple hotlist and the extracted data.

Vector Space Representation for Text

The text in FIG. 11 can be understood, in part, because of the regular appearance of the substrings that are recognized as (fictitious) university names. These strings are recognizable because they "look like" the names of real universities. Implementing such heuristics requires a precise notion of similarity for text, and one such notion is provided by the well-known vector space model of text.

In the vector space model, a piece of text is represented as a document vector. The vocabulary T of terms are word stems produced by the well-known Porter stemming algorithm. A document vector is a vector of real numbers $\vec{v} \in R^{|T|}$, each component of which corresponds to a term $t \in T$. The component of $\vec{v}$ which corresponds to $t \in T$ by $v_t$, and employ the TF-IDF weighting scheme for a document vector $\vec{v}$ appearing in a collection C, where $v_t$ is zero if the term t does not occur in text represented by $\vec{v}$, and otherwise let $v_t = (\log(TF \vec{v}, _t) + 1) \cdot \log(IDF_t)$. In this formula, TF $\vec{v}, _t$ is the number of times that term t occurs in t he document represented by $\vec{v}$, and $IDF_t = |C|/|C_t|$, where $C_t$ is the set of documents in C that contain t.

In the vector space model, the similarity of two document vectors $\vec{v}$ and $\vec{w}$ is given by the formula $SIMS(\vec{v},\vec{w}) = \Sigma t \in T(v_t \cdot w_t / \|\vec{v}\| \cdot \|\vec{w}\|)$. Notice that $SIM(\vec{v},\vec{w})$ is always between zero and one, and that similarity is large only when the two vectors share many important (highly weighted) terms.

WHIRL Logic

Whirl is a logic in which the fundamental items that are manipulated are not atomic values, but entities that correspond to fragments of text. Each fragment is represented internally as a document vector. This means that the similarity between any two items can be computed. In brief, WHIRL is a non-recursive, function-free Prolog with the addition of a built-in similarity predicate; rather than being true or false, a similarity literal is associated with a real-valued "score" between 0 and 1, and scores are combined as if they were independent probabilities.

As an example of a WHIRL query, suppose that the information extracted from the simple list of FIG. 12 is stored as a predicate ed_board(X). Suppose also that the information extracted from the hotlist in FIG. 12, together with a number of similar bibliography hotlists, has been stored in a predicate paper (Y, Z, U), where Y is an author name, Z is a paper title, and U is a paper URL. For instance, the following facts may have been extracted and stored: ed_board("Phoebe L. Mind, Laugh Tech"), and paper (Phoebe Mind", "A linear-time version of GSAT", "http://.../peqnp.ps"). Using WHIRL's similarity predicate "~", the following query might be used to find papers written by editorial board members:

ed_board(X) Âpaper(Y,Z,U) ÂX~Y.

The answer to this query would be a list of substitutions θ, each with an associated score. Substitutions that bind X and Y to similar documents would be scored higher. One high-scoring substitution might bind X to "Phoebe L. Mind, Lough Tech" and Y to "Phoebe Mind".

Below, there will be provided a brief discussion of WHIRL. As noted above, a more detailed description is found in the U.S. Pat. No. 6,295,533, entitled and issued on Sep. 25, 2001, which is incorporated by reference herein.

WHIRL Semantics

A WHIRL program consists of two parts: an extensional database (EDB), and an intensional database (IDB). The IDB is a non-recursive set of function -free definite clauses. The EDB is a collection of ground atomic facts, each associated with a numeric score in the range (0, 1). In addition to the types of literals normally allowed in a DDB, clauses in the IDB can also contain similarity literals of the form X~Y, where X and Y are variables. A WHIRL predicate definition is called a view. For purposes of this discussion, views are assumed to be flat; that is, each clause body in the view contains only literals associated with predicates defined in the EDB. Since WHIRL does not support recursion, views that are not flat can be "flattened" (unfolded) by repeated resolution.

In a conventional DDB, the answer to a conjunctive query would be the set of ground substitutions that make the query true. In WHIRL, the notion of provability may be replaced with a "soft" notion of score, which will now be defined. Let θ be a ground substitution for B. If $B = p(x_1, \ldots X_a)$ corresponds to a predicate defined in the EDB, then SCORE (B, θ)=s if Bθ is a fact in the EDB with score s, and SCORE(B,θ)=0 otherwise. If B is a similarity literal X~Y, then $SCORE(B,\theta) = SIM(\vec{x},\vec{y})$, where $\vec{x} = X\theta$ and $\vec{y} = Y\theta$. If $B = B_1 Â \ldots ÂB_k$ is a conjunction of literals, then SCORE $(B,\theta) = \Pi_{i-1} SCORE(B_i,\theta)$. Finally, consider a WHIRL view, defined as a set of clauses of the form $A_i$–$Body_i$. For a ground atom a that is an instance of one or more $A_i$'s, the support of a, SUPPORT(a), is defined to be the set of all pairs (σ, $Body_i$) such that $A_i\sigma = a$, $Body_i\sigma$ is ground, and SCORE($Body_i$, σ)→0. The score of an atom a (for this view) is defined to be 1-Π                                      (1–SCORE($Body_i$, σ)).

(σ, BODY)∈ SUPPORT(a)

This definition follows from the usual semantics of logic programs, together with the observation that if $e_1$ and $e_2$ are independent events, then $Prob(e_1 \vee e_2) = 1 - (1 - Prob(e_1))(1 - Prob(e_2))$.

The operations most commonly performed in WHIRL are to define and materialize views. To materialize a view, WHIRL finds a set of ground atoms a with non-zero score sa for that view, and adds them to the EDB. Since in most cases, only high-scoring answers will be of interest, the materialization operator takes two parameters: $r_1$ an upper bound on the number of answers that are generated, and $\epsilon$, a lower bound on the score of answers that are generated.

Although the procedure used for combining scores in WHIRL is naive, inference in WHIRL can be implemented quite efficiently. This is particularly true if $\epsilon$ is large or r is small, and if certain approximations are allowed.

The "many" construct

The structure-recognition methods described herein require a recent extension to the WHIRL logic: a "soft"

version of universal quantification. This operator is written many(Template, Test) where the Test is an ordinary conjunction of literals, and the Template is a single literal of the form $p(Y_1, \ldots, Y_n)$, where p is an EDB predicate and the $Y_1$'s are all distinct; also, the $Y_i$'s may appear only in Test. The score of a "many" clause is the weighted average score of the Test conjunction on items that match the Template. More formally, for a substitution e and a conjunction W, $$\text{SCORE}(\text{many}(p(Y_1, \ldots, Y_k), \text{Test}), \theta) = \Sigma s/S \cdot \text{SCORE}(\text{Test}, (\theta \cdot \{Y_i = a_i\}_i)), \quad (s, a_1, \ldots a_k) \in P$$

where P is the set of all tuples $(s, a_1, \ldots, a_k)$ such that $p(a_1, \ldots a_k)$ is a fact in the EDB with score s; S is the sum of all such scores s; and $\{Y=a_i\}_i$ denotes the substitution $\{Y_1=a_1, \ldots Y_k=a_k\}$.

As an example, the following WHIRL query is a request for editorial board members that have written "many" papers on neural networks.

q(X)–ed_board(X) Âmany(papers(Y,Z,W), (X~Y ÂZ~"neural networks")).

Recognizing Structure with WHIRL a. Encoding HTML Pages and Wrappers

To encode an HTML page in WHIRL, the page is first parsed. The HTML parse tree is then represented with the following EDB predicates:

elt(Id,Tag,Text,Position) is true if Id is the identifier for a parse tree node, n, Tag is the HTML tag associated with n, Text is all of the text appearing in the subtree rooted at n, and Position is the sequence of tags encountered in traversing the path from the root to n. The value of Position is encoded as a document containing a single term $t_{pos}$, which represents the sequence e.g., $t_{pos}$= "html_body_ul_li".

attr(Id,AName,AValue) is true if Id is the identifier for node n, AName is the name of an HTML attribute associated with n, and AValue is the value of that attribute.

path(FromId,ToId,Tags) is true if Tags is the sequence of HTML tags encountered on the path between nodes FromId and ToId. This path includes both endpoints, and is defined if FromId=ToId.

As an example, wrappers for the pages in FIG. 12 can be written using these predicates as follows:

page 1 (NameAffil)←elt(_, , NameAffil, "html_body_ table_tr_td");

page2(Title,Url)←elt(ContextElt, _, Title, "html_body_ ul_li")

Âpath(ContextElt, AnchorElt, "li_a")

Âattr(AnchorElt, "href", Url).

Next, a discussion of appropriate encoding of "structures" is provided. Most simple lists and simple hotlists can be wrapped with some variant of either the page 1 or the page2 view, in which the constant strings (e.g., "html_body_ul li" and "li_a") are replaced with different values. Many of the remaining pages can be wrapped by views consisting of a disjunction of such clauses.

A new construct is required to formally represent the informal idea of a "structure" in a structured document: a wrapper piece. In the most general setting, a wrapper piece consists of a clause template (e.g., a generic version of page2 above), and a set of template parameters (e.g., the pair of constants "html_body_ul_li" and "li_a"). In the experiments discussed below, only two clause templates were considered, the ones suggested by the examples above—and it is assumed that the recognizer knows, for each page, if it should look for list structures or hotlist structures. In this case, the clause template need not be explicitly represented; a wrapper pieces for a page2 variant can be represented simply as a pair of constants (e.g., "html_body_ul_li" and "li_a"), and a wrapper piece for a page 1 variant can be refreshed as a single constant (e.g., html_body_table_tr_ td).

For the sake of description, only the methods that recognize simple hotlist structures analogous to page2 are discussed, and assume that structures are encoded by a pair of constants Path 1 and Path2. However, the methods discussed herein recognize simple lists as well.

Enumerating and Ranking Wrappers Three structure-recognition methods are discussed below. Assume that some page of interest has been encoded in WHIRL's EDB (or in some EDB), materializing the WHIRL view possible_piece, shown in FIG. 13, will generate all wrapper pieces that would extract at least one item from the page. The extracted_by view determines which items are extracted by each wrapper piece, and hence acts as an interpreter for wrapper pieces.

Using these views in conjunction with WHIRL's soft universal quanitification, one can compactly state a number of plausible recognition heuristics. One heuristic is to prefer wrapper pieces that extract many items; this trivial but useful heuristic is encoded in the fruitful_piece view. Recall that materializing a WHIRL view results in a set of new atoms, each with an associated score. The fruitful_piece view can thus be used to generate a ranked list of proposed "structures" by simply presenting all fruitful_piece facts to the user in decreasing order by score.

Another structure-recognition method is suggested by the observation that in most hotlists, the text associated with the anchor is a good description of the associated object. This suggests the anchorlike_piece view, which adds to the fruitful_piece view an additional "soft" requirement that the text Text1 extracted by the wrapper piece be similar to the text Text2 associated with the anchor element.

Another structure-recognition method is the R_like_ piece view. This view is a copy of fruitful_piece view in which the requirement that many items are extracted is replaced by a requirement that many "R like" items are extracted, where an item is "R like" if it is similar to some second item X that is stored in the EDB relation R. The "soft" semantics of the many construct imply that more credit is given to extracting items that match an item in R closely, and less credit is given for weaker matches. As an example, suppose that R contains a list of all accredited universities in the United States. In this case, the R_like_ piece would prefer wrapper pieces that extract many items that are similar to some known university name; this might be useful in processing pages like the one shown in FIG. 11. In experiments, the R_like_piece view provided the best results.

Maintaining A Wrapper

Maintaining wrappers is a time-consuming process. However, the invention proposes a new source of information by retaining, for each wrapper, the data that was extracted from the previous version of the page. If the format of the page has been changed, but not its content, then the previously-extracted data can be used as page-specific training examples for the new page format, and the examplelike method can be used to derive a new wrapper. If the format and the content both change, then the data extracted from the old version of the page could still be used; however, it would only be an approximation to the examples that a user would provide. Using such "approximate examples" will presumably make structure-recognition more difficult.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A method of extracting data from data sources in a network, said method comprising:

inputting a plurality of pairs of data from said network, each pair comprising a data source and a program which accurately extracts data from said data source;

determining, for each of said pairs of data, a parse tree for said data source, said parse tree comprising nodes;

labeling, for each of said pairs of data, said nodes of said parse tree for said data source according to said program for extracting data from said data source to obtain labeled parse tree nodes;

generating a data set from said labeled parse tree nodes obtained for each of said pairs of data; and training a learning algorithm with said data set to learn a general program for labeling parse tree nodes of new data sources to extract data from said new data sources.

2. The method according to claim 1, further comprising storing said data set in a data base.

3. The method according to claim 1, wherein said learning algorithm is a rule learning program for Repeated Incremental Pruning to Produce Error Reduction (RIPPER).

4. The method according to claim 1, wherein said data sources and said new data sources are Web pages from the World Wide Web.

5. The method according to claim 1, further comprising:

inputting a new data source;

determining a new parse tree for a new data source, said new parse tree comprising nodes;

labeling said nodes of said new parse tree for said new data source according to said general program to obtain new labeled parse tree nodes; and extracting data from said new data source based upon said new labeled parse tree nodes.

6. The method according to claim 5, wherein said new data source is a Web page from the World Wide Web.

7. A computer-readable medium storing computer-executable instructions for performing a method of extracting data from data sources in a network, comprising:

inputting a plurality of pairs of data, each pair comprising a data source and a program which accurately extracts data from said data source;

determining, for each of said pairs of data, a parse tree for said data source, said parse tree comprising nodes;

labeling, for each of said pairs of data, said nodes of said parse tree for said data source according to said program for extracting data from said data source to obtain labeled parse tree nodes;

generating a data set from said labeled parse tree nodes obtained for each of said pairs of data; and training a learning algorithm with said data set to learn a general program for labeling parse tree nodes of new data sources to extract data from said new data sources.

8. The computer-readable medium according to claim 7, further comprising computer-executable instructions for storing said data set in a database.

9. The computer-readable medium according to claim 7, wherein said learning algorithm is a rule learning program for Repeated Incremental Pruning to Produce Error Reduction (RIPPER).

10. The computer-readable medium according to claim 9, wherein said data sources and said new data sources are Web pages from the World Wide Web.

11. The computer-readable medium according to claim 9, further comprising computer-executable instructions for performing the steps of:

inputting a new data source;

determining a new parse tree for a new data source, said new parse tree comprising nodes;

labeling said nodes of said new parse tree for said new data source according to said general program to obtain new labeled parse tree nodes; and extracting data from said new data source based upon said new labeled parse tree nodes.

12. The computer-readable medium according to claim 11, wherein said new data source is a Web page from the World Wide Web.

13. An apparatus for extracting data from data sources in a network, comprising:

means for inputting a plurality of pairs of data, each pair of data comprising a data source and a program which accurately extracts data from said data source;

means for determining, for each of said pairs of data, a parse tree for said data source, said parse tree comprising nodes;

means for labeling, for each of said pairs of data, said nodes of said parse tree for said data source according to said program for extracting data from said data source to obtain labeled parse tree nodes;

means for generating a data set from said labeled parse tree nodes obtained for each of said pairs of data; and means for training a learning algorithm with said data set to learn a general program for labeling parse tree nodes of new data sources to extract data from said new data sources.

14. The apparatus according to claim 13, further comprising means for storing said data set in a database.

15. The apparatus according to claim 13, wherein said learning algorithm is a rule learning program for Repeated Incremental Pruning to Produce Error Reduction (RIPPER).

16. The apparatus according to claim 13, wherein said data sources and said new data sources are Web pages from the World Wide Web.

17. A method of extracting data from data sources in a network, said method comprising:

inputting a plurality of pairs of data from said network, each pair comprising a data source and a program which accurately extracts data from said data source;

determining, for each of said pairs of data, a parse tree for said data source, said parse tree comprising nodes;

labeling, for each of said pairs of data, said nodes of said parse tree for said data source according to said program for extracting data from said data source to obtain labeled parse tree nodes;

generating a data set from said labeled parse tree nodes obtained for each of said pairs of data;

training a learning algorithm with said data set to learn a general program for labeling parse tree nodes of new data sources to extract data from said new data sources;

inputting a new data source;

processing said new data source in accordance with said general program to extract data from said new data source;

determining whether performance of said general program meets a predetermined threshold based upon the data extracted from said new data source;

when said performance of said general program does not meet said predetermined threshold, prompting a user to input a specific parse tree label for a specific node on said new data source;

training said learning algorithm with said data set and said specific parse tree label for said specific node to learn a specific program for labeling parse tree nodes of said new data source to extract data from said new data source; and repeating said prompting step and said learning step for said new data source until performance of said specific program meets said predetermined threshold.

18. The method according to claim 17, further comprising storing said data set in a database.

19. The method according to claim 17, wherein said learning
algorithm is a rule learning program for Repeated Incremental Pruning to Produce Error Reduction (RIPPER).

20. The method according to claim 17, wherein said data sources, said new data sources, and said new data source are Web pages from the World Wide Web.

21. A computer-readable medium storing computer-executable instructions for performing a method of extracting data from data sources in a network, comprising:

inputting a plurality of pairs of data from said network, each pair comprising a data source and a program which accurately extracts data from said data source;

determining, for each of said pairs of data, a parse tree for said data source, said parse tree comprising nodes;

labeling, for each of said pairs of data, said nodes of said parse tree for said data source according to said program for extracting data from said data source to obtain labeled parse tree nodes;

generating a data set from said labeled parse tree nodes obtained for each of said pairs of data;

training a learning algorithm with said data set to learn a general program for labeling parse tree nodes of new data sources to extract data from said new data sources;

inputting a new data source;

processing said new data source in accordance with said general program to extract data from said new data source;

determining whether performance of said general program meets a predetermined threshold based upon the data extracted from said new data source;

when said performance of said general program does not meet said predetermined threshold, prompting a user to input a specific parse tree label for a specific node on said new data source;

training said learning algorithm with said data set and said specific parse tree label for said specific node to learn a specific program for labeling parse tree nodes of said new data source to extract data from said new data source; and repeating said prompting step and said learning step for said new data source until performance of said specific program meets said predetermined threshold.

22. The computer-readable medium according to claim 21, further comprising storing said data set in a database.

23. The computer-readable medium according to claim 21, wherein said learning algorithm is a rule learning program for Repeated Incremental Pruning to Produce Error Reduction (RIPPER).

24. The computer-readable medium according to claim 21, wherein said data sources, said new data sources, and said new data source are Web pages from the World Wide Web.

25. An apparatus for extracting data from data sources in a network, comprising:

means for inputting a plurality of pairs of data from said network, each pair comprising a data source and a program which accurately extracts data from said data source;

means for determining, for each of said pairs of data, a parse tree for said data source, said parse tree comprising nodes;

means for labeling, for each of said pairs of data, said nodes of said parse tree for said data source according to said program for extracting data from said data source to obtain labeled parse tree nodes;

means for generating a data set from said labeled parse tree nodes obtained for each of said pairs of data;

means for training a learning algorithm with said data set to learn a general program for labeling parse tree nodes of new data sources to extract data from said new data sources;

means for inputting a new data source;

means for processing said new data source in accordance with said general program to extract data from said new data source;

means for determining whether performance of said general program meets a predetermined threshold based upon the data extracted from said new data source;

means for prompting a user to input a specific parse tree label for a specific node on said new data source when said performance of said general program does not meet said predetermined threshold;

means for training said learning algorithm with said data set and said specific parse tree label for said specific node to learn a specific program for labeling parse tree nodes of said new data source to extract data from said new data source; and means for repeating said prompting step and said learning step for said new data source until performance of said specific program meets said predetermined threshold.

26. The apparatus according to claim 25, further comprising means for storing said data set in a database.

27. The apparatus according to claim 25, wherein said learning
algorithm is a rule learning program for Repeated Incremental Pruning to Produce Error Reduction (RIPPER).

28. The apparatus according to claim 25, wherein said data sources, said new data sources, and said new data source are Web pages from the World Wide Web.

* * * * *